United States Patent [19]

Oilar

[11] Patent Number: 5,005,717
[45] Date of Patent: Apr. 9, 1991

[54] INSULATED BEVERAGE CUP

[75] Inventor: Clayton D. Oilar, P.O. Box 64, Cedarville, Calif. 96104

[73] Assignee: Clayton Dale Oilar, Cedarville, Calif.

[21] Appl. No.: 544,178

[22] Filed: Jun. 26, 1990

[51] Int. Cl.$^5$ ............................................. A47G 19/22
[52] U.S. Cl. .................................. 215/13.1; 215/1 A; 215/229; 220/90.2; 224/148
[58] Field of Search ....................... 215/1 A, 1 C, 12.1, 215/12.2, 13.1, 229; 224/148, 202; 229/103.1; 220/90.2, 444, 428, 901, 902; 222/183, 211

[56] References Cited

U.S. PATENT DOCUMENTS

| | | | |
|---|---|---|---|
| 1,568,176 | 1/1926 | Mohan | 220/428 X |
| 1,811,286 | 6/1931 | Tyndall | 215/13.1 X |
| 2,194,011 | 3/1940 | Davidson | 229/103.1 |
| 2,263,947 | 11/1941 | Gottfried | 229/103.1 X |
| 2,815,879 | 12/1957 | Hermes | 215/229 X |
| 2,909,305 | 10/1959 | Opsitnik | 215/13.1 X |
| 3,070,253 | 12/1962 | Brown | 220/902 X |
| 3,268,792 | 8/1966 | Barmherzig | 220/90.2 |
| 3,312,373 | 4/1967 | Gentry | 215/12.5 X |
| 3,349,987 | 10/1967 | Weitzner | 220/90.2 X |
| 3,558,033 | 1/1971 | Leeds | 229/103.1 |
| 3,840,153 | 10/1974 | Devlin | 222/211 X |
| 4,016,998 | 4/1977 | Finch | 215/1 A |
| 4,095,812 | 6/1978 | Rowe | 224/148 X |
| 4,244,477 | 1/1981 | Seel | 220/90.2 X |
| 4,252,256 | 2/1981 | Walsh | 222/211 |
| 4,437,576 | 3/1984 | Barniak | 229/103.1 X |
| 4,442,948 | 4/1984 | Levy et al. | 220/90.2 |
| 4,516,693 | 5/1985 | Gaston | 222/183 X |
| 4,537,044 | 8/1985 | Putnam | 220/902 X |
| 4,596,341 | 6/1986 | Bruffey | 220/90.2 X |
| 4,607,755 | 8/1986 | Andreozzi | 215/1 A |
| 4,684,032 | 8/1987 | Tsay | 215/1 A |
| 4,733,807 | 3/1988 | Porter et al. | 224/202 |
| 4,852,762 | 8/1989 | Chou-Sheng | 215/229 X |
| 4,925,040 | 5/1990 | Wang | 220/90.2 X |
| 4,928,876 | 5/1990 | Marshall | 229/103.1 |

FOREIGN PATENT DOCUMENTS

| | | | |
|---|---|---|---|
| 23561 | 3/1906 | Austria | 215/6 |
| 722477 | 11/1965 | Canada | 222/183 |
| 94235 | 11/1983 | European Pat. Off. | 220/90.2 |
| 3626848 | 2/1988 | Fed. Rep. of Germany | 215/1 C |
| 598612 | 2/1948 | United Kingdom | 229/103.1 |
| 978901 | 1/1965 | United Kingdom | 229/103.1 |

*Primary Examiner*—Sue A. Weaver

[57] ABSTRACT

A thermally insulated, spill-resistant bevarage container and dispenser having a resealable threaded lid at the top end thereof, and an internal straw receiver and drinking spout. The annular sidewall and bottom end of the container are comprised of an interior and exterior layer of liquid impervious thermoplastic, housing therebetween a single layer of lightweight thermal insulation material. The insulation material maintains the temperature of the contained beverage, whether hot or cold, for an extended period of time. The straw receiver is comprised of a tubular passageway extending from the top of the cup downward outside the thermal insulation of the sidewall to open into the bottom interior of the beverage containment chamber of the container. The non-insulated straw receiver allows hot beverages to cool slightly before being drank. Affixed to the top of the container and aligned over the straw receiver is a tubular extension structured to serve as a drinking spout. Both the straw receiver and aligned drinking spout are sized and shaped for receiving a conventional disposable straw, used to extend the length of the drinking spout when desired. The drinking spout is affixed with a removable tethered cap to allow sealing when desired. The top outer edge of the container is affixed with two oppositely disposed tab handles to which are attached an elongated carrying strap.

2 Claims, 2 Drawing Sheets

INSULATED BEVERAGE CUP

BACKGROUND OF THE INVENTION

1. Field of the Invention:

This invention relates to insulated beverage containers in general, and more precisely to a spill-resistant thermally insulated cup with a built-in straw receiver. This device is especially useful for bicyclists and motorists who require the use of at least one hand while riding or driving.

2. Description of the Prior Art:

People often wish to carry some type of beverage with them while driving, riding a bicycle or even jogging. One obvious disadvantage to carrying an open cup or bottle of some type is the frequent occurrence of spills. Various types of single serving containers have since been introduced to solve this problem, including commuter cups, and the relatively new plastic containers with affixed straws. Both of these types of containers have various disadvantages, including lids that require two hands to remove, holders that do not fit the containers, containers that must be tilted upward for the user to drink the contained beverage, and containers that are not insulated, allowing the contained beverage to become unpalatably cold or warm. Many of these containers may also leak considerably when turned on their side. Any operation that requires the use of two hands, such as removal of lids, or that distracts the driver from maintaining eye contact with the road, is potentially dangerous and could result in an accident. Bicyclists are especially suspectable to this situation, where they must be momentarily distracted to replace the container in a holder. The holders often do not securely retain the containers or they can be inadvertently dropped by the rider, causing the rider to stop and retrieve his possibly damaged container. Bicyclists often go out on extended outings where they find the plastic containers with affixed straws convenient and correctly sized for conventional holders, but inadequate for maintaining the temperature of their beverage. Heavy thermos type containers are not only inconvenient for bicyclists due to the limited weight restrictions, especially for bicycle racers, but they also require the use of two hands to operate.

Although plastic containers with integral straws and insulated commuter cups are known, and solve some of the problems associated with transporting beverages, neither one completely solves all the problems previously mentioned, especially those experienced by the bicyclist.

A past art patent search was conducted in the U.S. Patent Office to examine insulated beverage cups. Two U.S. patents, one issued to Andreozzi, U.S. Pat. No. 4,607,755, dated Aug. 26, 1986, and the other to Bruffey, U.S. Pat. No. 4,596,341, dated June 24, 1986, represent devices indicative of lidded containers with integral straws. The Andreozzi device teaches a lidded cup with an internal tube affixed with an external flexible elongated straw. The flexible straw would be very inconvenient to operate without the use of two hands. Andreozzi also provides a bracket handle for attachment to an automobile door frame, which would not be compatible for attachment to the frame of a bicycle or somewhere on the rider himself. The Bruffey device teaches a toy drinking cup having a detachable lid affixed with an external drinking spout and internal dip tube. Bruffey's device does not have any form of support structure for attachment to a bicycle or the rider, and it also appears very difficult to clean due to the right angle formation of the drinking spout. Both the Andreozzi and Bruffey devices are not structured for maintaining the temperature of the contained liquid for an extended period of time due to what appears to be poor thermal insulation.

On Apr. 12, 1977, Finch was issued U.S. Pat. No. 4,016,998, for an improved drinking vessel with inherent straw. Finch does not appear to provide thermal insulation for his cup, nor is it particularly designed to be spill resistant in that he does not provide a sealable cap or lid. A conventional drinking straw could not be inserted into his straw channel due to its curved design. There is also no supporting straps or brackets for attachment to a person or object.

Barmherzig was granted U.S. Pat. No. 3,268,792, on Aug. 23, 1966, for a beverage container with an extendable and retractable drinking straw. Barmherzig's internal straw is accessible only by removal of an external tethered cap. The container does not appear insulated nor affixed with any carrying structure for attachment to a person or object.

Shung-Der Tsay was issued U.S. Pat. No. 4,684,032, dated Aug. 4, 1987, for a thermos bottle with retractable tube. Shung-Der Tsay teaches a complicated, multi-unit container which not only appears expensive to manufacture, but extremely difficult to clean. The container is also not structured with an attachment member for connection to an object or person.

None of the previously mentioned past art devices solve all the disadvantages previously mentioned. Cleaning of the integral straws or tubes of several of the past art devices appears extremely difficult due to the acutely angled or curved structure. Use of conventional disposable straws is impossible with most of the past art devices due also to the angling of the tubes. Modifications and adaptations would therefore first have to be anticipated and then implemented in these past art devices to produce a device with the functions and structure of my invention.

SUMMARY OF THE INVENTION

I have provided a thermally insulated beverage container with resealable lid and integral internal straw receiver and drinking spout. The external drinking spout is affixed with a tethered cap, and the internal tube is adapted for receiving and housing a portion of a conventional disposable straw by way of the relatively straight and properly sized structure of the straw receiver. This structuring also makes the straw receiver easier to clean. The upper rim of the container contains two outer projecting handles which are affixed with an elongated carrying strap. The carrying strap serves to retain the container preferably about a rider's neck, across his shoulders, or framing of the bicycle. The thermal insulation is preferably comprised of a low cost, light weight closed celled foamed plastic, such as a polystyrene. The formed insulated plastic is covered with a relatively thin interior and exterior layer of impervious thermoplastic such as un-foamed polystyrene.

My device is especially convenient for use by bicyclists, but is also directed for use by motorists, children, and athletes, among others. The container maintains the beverage at a preferred temperature for an extended period of time, and prevents spillage with the resealable lid and spout cap. Once suspended from the user's neck, as with bicyclists, the container is easily retrieved with one hand with the spout cap being removable with the rider's mouth. There is no danger of the container being dropped, and the lightweight materials of manufacture do not create an excessive strain on the rider's neck, although it is preferable to place the carrying strap to one side of the neck across the torso. The strap also allows the rider to park and leave the bicycle and still conveniently carry the container, leaving the hands free. Replacement of the cap can be accomplished with the thumb of one hand, thus allowing one-handed manipulation of the container with the rider maintaining control of the bike with the other hand. The container can also be inserted into cup, can, or bottle holders with the outer projecting handles preventing the device from slipping too far down into the holder to be easily retrieved.

Although I have suggested the major use of the device is directed towards bicyclists, it can also be useful in a variety of other applications. As a commuter cup the device is also especially useful in that is spill resistant due to the replaceable cap and screw-on lid, which is particularly useful with children who often leave the containers completely on the side. The strap also eliminates children from loosing or misplacing the container. Joggers or others who wish to have their hands free also benefit from the carrying strap. This cup can also be drank out of without tilting the container, due to the drinking spout. This feature helps the driver maintain constant eye contact with the road, thus possibly avoiding accidents. A conventional straw can also be used with this device, inserted into the drinking spout, to extend the drinking spout if desired. The smooth external surface of the container is also an ideal surface to display advertisements. The low cost of manufacture of the container can enable this device to become a give away item displaying the promoters advertisement.

My insulated beverage cup is re-usable thousands of times, and is useful just about anyplace including sporting events and the like. The re-usable insulated cup will hopefully greatly reduce the number of styrofoam cups thrown away each year, helping our environmental situation.

Therefore, a primary object of my invention is to provide a thermally insulated spill resistant cup with built-in disposable straw receiver which can be drank from with or without the use of an additional straw by bicyclists and motorists.

Another object of my invention is to provide a thermally insulated cup which the user can carry on his or her person.

A further object of my invention is to provide a thermally insulated cup which is lightweight and easy to clean.

An even further object of my invention is to provide a thermally insulated cup which is inexpensive to manufacture and is comprised of a minimum of parts.

A still further object of my invention is to provide a thermally insulated cup which can utilize conventional disposable straws, and is sized for insertion into existing beverage holders of the type mountable to bicycle frames and automobile door frames.

Other objects and advantages of my invention will become apparent from reviewing the remaining specification and examination of the accompanying numbered drawings.

DESCRIPTION OF THE PREFERRED EMBODIMENT

Figure 2:
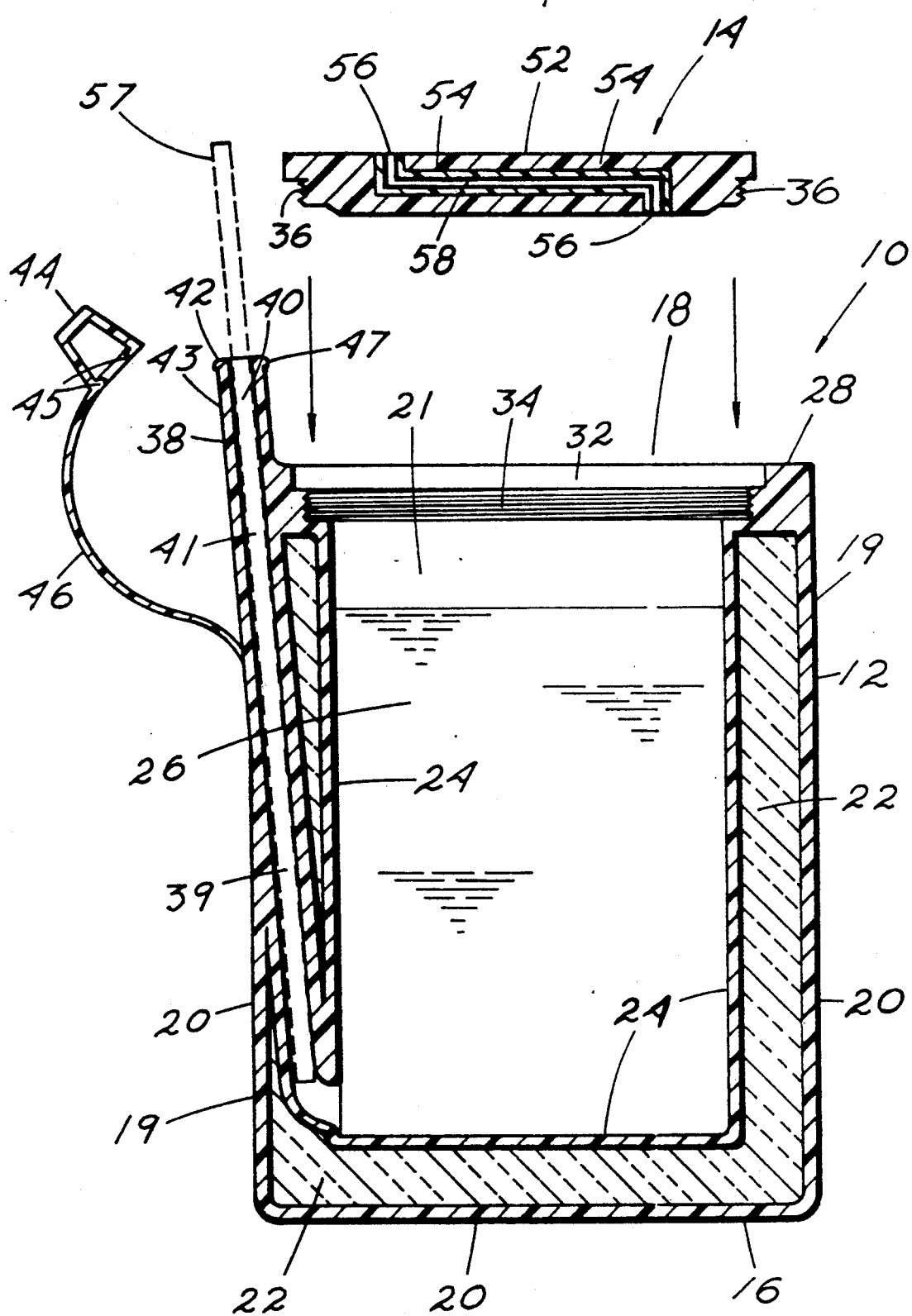
FIG. 2 is a cross-sectional side view showing the various composite layers and insulation of the container, and further depicting a disposable straw inserted into the drinking spout and straw receiver.

Referring now to the drawings where the invention is illustrated. Insulated container or cup 10 generally refers to the invention as a unit, and is basically comprised of cup housing 12 and lid 14. Cup housing 12 is an open tubular member having one closed bottom end 16 and an oppositely disposed opened top end 18, with a substantially vertical annular sidewall 19 surrounding the hollow interior 21. Sidewall 19 and closed bottom end 16 of cup housing 12 are structured in three layers. The outer or exterior layer forms exterior covering 20, and is visible to the user as the outside housing of cup 10. The second layer is comprised of a light weight thermal insulation medium, preferably an expanded foamed plastic, referred to as insulation 22. Insulation 22 cannot be seen by the user under general use conditions, but is illustrated in cross section in FIG. 2. The third layer is designated as interior lining 24, which serves to retain the fluid or beverage 26 within hollow interior 21. Exterior covering 20 and interior lining 24 actually form one continuous thin layer around insulation 22, as shown in FIG. 2. Both exterior covering 20 and interior lining 24 are comprised of an impervious thermoplastic, such as polystyrene. Both layers converge at open top end 18, in wide flat lip 28. The entire interior edge of lip 28 is formed into a shallow recession referred to as lid recess 32. Directly below lid recess 32 are threads 34 which are sized to correlate with lid threads 36 of lid 14.

Extending above the top end of cup 10 and downward through sidewall 19 is straw receiver 38, best shown in FIG. 2. Straw receiver 38 is a tubular member that extends substantially vertically downward within sidewall 19. The interior of straw receiver 38 is hollow and forms first passage 39 within the interior of sidewall 19. First passage 39 is in communication with hollow interior 21 adjacent bottom 16 where beverage 26 is contained. First passage 39 is placed within sidewall 19 so that the inward or interior side of the passage is surrounded with insulation, but the exterior or outward side of passage 39 is generally un-insulated as shown in FIG. 2. The outward or exterior side of first passage 39 allows very hot beverages to cool slightly to avoid burning of the mouth as the beverage is being sipped. The upper end of straw receiver 38 extends a short distance above lip 28, forming drinking spout 42. Drinking spout 42 is also a tubular member having an annular sidewall 43, and an open interior referred to as second passage 40. Both first passage 39 and second passage 40 are aligned and in communication with one another, forming one continuous fluid passage 41. The exterior opening of drinking spout 42 is sealed with a removable cap 44. Cap 44 is affixed to exterior covering 20 by an elongated narrow strip, cap tether 46. Cap 44 and cap tether 46 are preferably comprised of the same material as exterior covering 20. The interior edge of cap 44 is formed with cap retainer flange 45 which snaps over a corresponding cap retainer flange 47 located on the outer upper distal edge of drinking spout 42. This type of snap fitting allows cap 44 to be securely attached to drinking spout 42, closing second passage 40 sufficiently to prevent leakage should insulated cup 10 tip over or be positioned on its side. Cup housing 12 also supports two identical oppositely disposed handles 48, shown in FIG. 1. Handles 48 are wide flat, roughly triangular, extensions of lip 28, and are formed as an integral portion of exterior covering 20 and lip 28, along sidewall 19. Each handle 48 extends horizontally outward from the upper edge of sidewall 19, the upper surface being flush with lip 28, and then angles downward. The downward angled distal end of each handle 48 contains strap aperture 49 for passage of an elongated carrying strap 50. Carrying strap 50 is a flexible cylindrical cord comprised of either natural or synthetic materials.

Lid 14 is a rigid annular disc preferably comprised of foamed thermoplastic material which skins on the outer surface thereof when pressed against the cool walls in an injection mold tool during the injection molding process of manufacturing of lid 14. The exposed outer surfaces of the finished lid 14 appear as smooth plastic, while the interior of lid 14 being of the foamed plastic provides a degree of thermal insulating. The bottom outer edge of lid 14 contains lid threads 36 which cooperate with cup threads 34, as previously mentioned, allowing removable attachment of lid 14 onto cup housing 12. The top surface of lid 14 contains a central circular depression approximately half the size of lid 14, which is halved by a narrow ridge referred to as handle or finger grip 52. The areas of the depression on either side of this ridge are designated as grip access 54. Finger grip 52 and grip access 54 enable the user to remove lid 14 from cup housing 12, for cleaning or refilling. The upper surface of finger grip 52 is flush with the upper surface of lid 14, with lid 14 in turn being flush with the surface of lip 28 when in the closed position.

Figure 1:
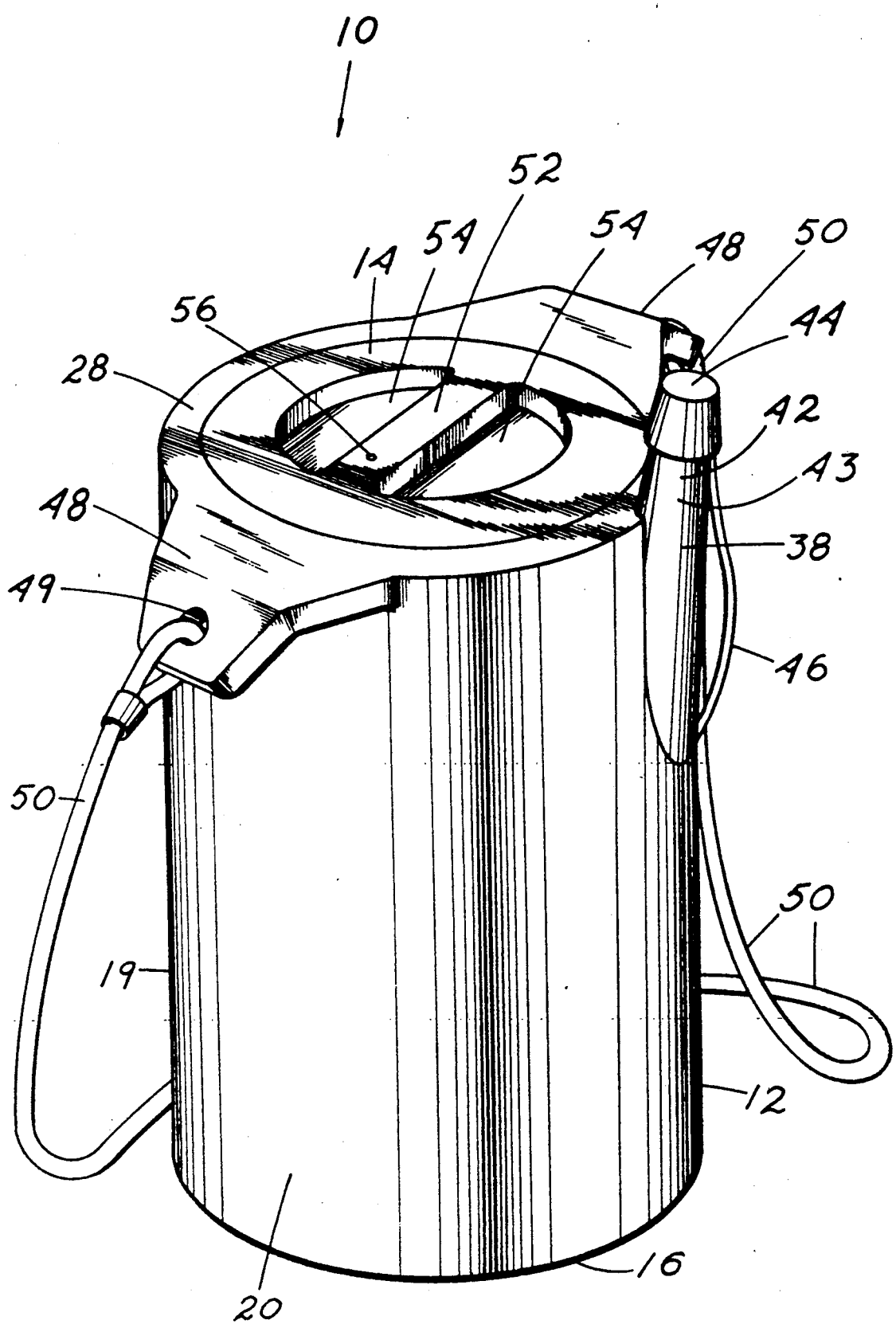
FIG. 1 is a perspective top view of the invention illustrating the handled screw on lid in place on top of the container, the tethered cap and drinking spout, and the two side handles and attached carrying strap.

Extending through lid 14 from the top surface to the bottom surface thereof is an open passageway structure designated vent 56 shown in FIG. 2. Vent 56 prevents a vacuum from developing within the cup during rapid drinking, and also releases any pressure which may develope with hot steaming beverages. Vent 56 is structured to help prevent leakage when the cup 10 is accidentally tipped on its side as might happen particulary with children. As shown in FIG. 1 the top end of vent 56 opens through finger grip 52, but off-center of the grip 52. In the sectional view of lid 14 in FIG. 2, lid 14 has been cross sectioned lengthwise with and through finger grip 52. The bottom end of vent 56 opens below finger grip 52 and off-center thereof, but off-center toward an oppositely disposed end of finger grip 52 than that of the top opening of vent 56. Connecting together the two openings of vent 56 is a small tubular passage 58. Tubular passage 58 of vent 56 may be manufactured using a slide pin in the plastic injection tool for making lid 14. However, using a slide pin will require a secondary operation for plugging the hole left in the outer edge of lid 14 from the withdrawal of the slide pin to enable the ejection lid 14 from the injection mold tool. Another way vent 56 and tubular passage 58 can be made with plastic injection molding is to drop-in a small Z-shaped tube into the mold cavity before injecting the plastic into the cavity. The Z-shaped tube would remain in lid 14 and form the vent 56 structure therethrough. The injection of the skinning foamed plastic would surround the Z-shaped vent 56 passage and provide a degree of thermal insulating quality to lid 14. The Z-shaped passage of vent 56, depending on what position the cup 10 is positioned on its side by accident, and further depending on the position of lid 14 when it came to stop on cup 10 when it was screwed thereon, will most often position one of the openings of the vent 56 higher than the other and above the fluid level, reducing the possibility of fluid leaking out of vent 56.

In use, the user removes lid 14, by unscrewing counter clockwise, in order to fill hollow interior 21 with the beverage 26 of his choice. Beverage 26 can either be hot or cold and will be maintained within a specific temperature range for an extended period of time due to thermal insulation 22. With lid 14 replaced, and cap 44 locked onto drinking spout 42, the user can place carrying strap 50 around his neck or over his neck and shoulder and leave his hands free for other purposes. Should the user want a drink of beverage 26, he can remove cap 44 with his hand or mouth and use drinking spout 42 to suck beverage 26 up through fluid passage 41. Fluid passage 41 is also sized and sufficiently straight for inserting a conventional disposable straw 57 into the top end of drinking spout 42 and pushing the straw 57 all the way through fluid passage 41 to adjacent bottom end 16 for extending the length of drinking spout 42, if desired. The straw 57 inserted into fluid passage 41 as shown in FIG. 2 allows a person to drink without the use of any hands if strap 50 is placed around the user's neck to retain cup 10 in close proximity to the user's face and mouth.

Insulated cup 10 is not only light weight and easy to carry with strap 50 but is also strong and durable, and withstands repeated washing. Insulated cup 10 is desirably made of a dishwasher and microwave safe materials. Fluid passage 41 can easily be cleaned, due to its straight structuring, with a conventional pipe cleaner when needed. Although not shown, the exterior surface of exterior covering 20 can be printed, embossed or otherwise affixed with some form of advertisement or design. The simple structuring of insulated cup 10 helps to maintain low cost production of this device, helping to promote the unit as an inexpensive promotional item.

Although the invention has been described in detail in the foregoing specification, it will be understood by those skilled in the art that some changes and modifications may be made in the invention without departing from the spirit and scope of the appended claims.

What I claim as my invention:

1. A thermally insulated spill-resistant beverage cup with straw receiving structure, comprising:
    a tubular housing structured of an annular sidewall, an affixed bottom panel and an open top end oppositely disposed from said bottom panel, said annular sidewall with said bottom panel defining an open interior chamber adapted to retain a beverage therein, said housing generally manufactured of thermal insulating materials, said annular sidewall of said housing having threads adjacent said top end with said thread in communication with said interior chamber;
    a handled lid affixed with threads positioned for removable engagement with said threads of said annular sidewall of said housing, said lid including means for providing a removable generally fluid tight seal over said interior chamber;
    a vent opening through said handled lid;
    a first tubular passage extending within and through said annular sidewall of said housing from adjacent said top end to adjacent said bottom panel, said first tubular passage opening into communication with said interior chamber adjacent said bottom panel;

a drinking spout structured of an annular sidewall defining a second tubular passage, said drinking spout affixed to said annular sidewall of said housing adjacent said top end with said second tubular passage aligned with and in communication with said first tubular passage in said annular sidewall of said housing;

said first tubular passage and said aligned second tubular passage each sized and sufficiently straight to removably receive a disposable drinking straw inserted through an upper open end of said second tubular passage downward through said first tubular passage to adjacent said bottom panel;

a cap affixed by a flexible tether to said cup, said cap including means for removable placement over said drinking spout to provide a generally fluid tight seal over said second tubular passage;

at least two oppositely disposed handles affixed to said annular sidewall of said housing adjacent said top end;

a flexible carrying strap and means for securing said strap to said oppositely disposed handles.

2. A thermally insulated spill-resistant beverage cup according to claim 1 wherein said annular sidewall and said bottom panel of said housing are structured of an internal and external layer of fluid impervious thermoplastic material sandwiching expanded foamed plastic insulation material therebetween.

* * * * *